Oct. 2, 1934.  C. E. BENNETT  1,975,075
ELECTRIC CABLE SYSTEM
Filed Sept. 2, 1932  2 Sheets-Sheet 2
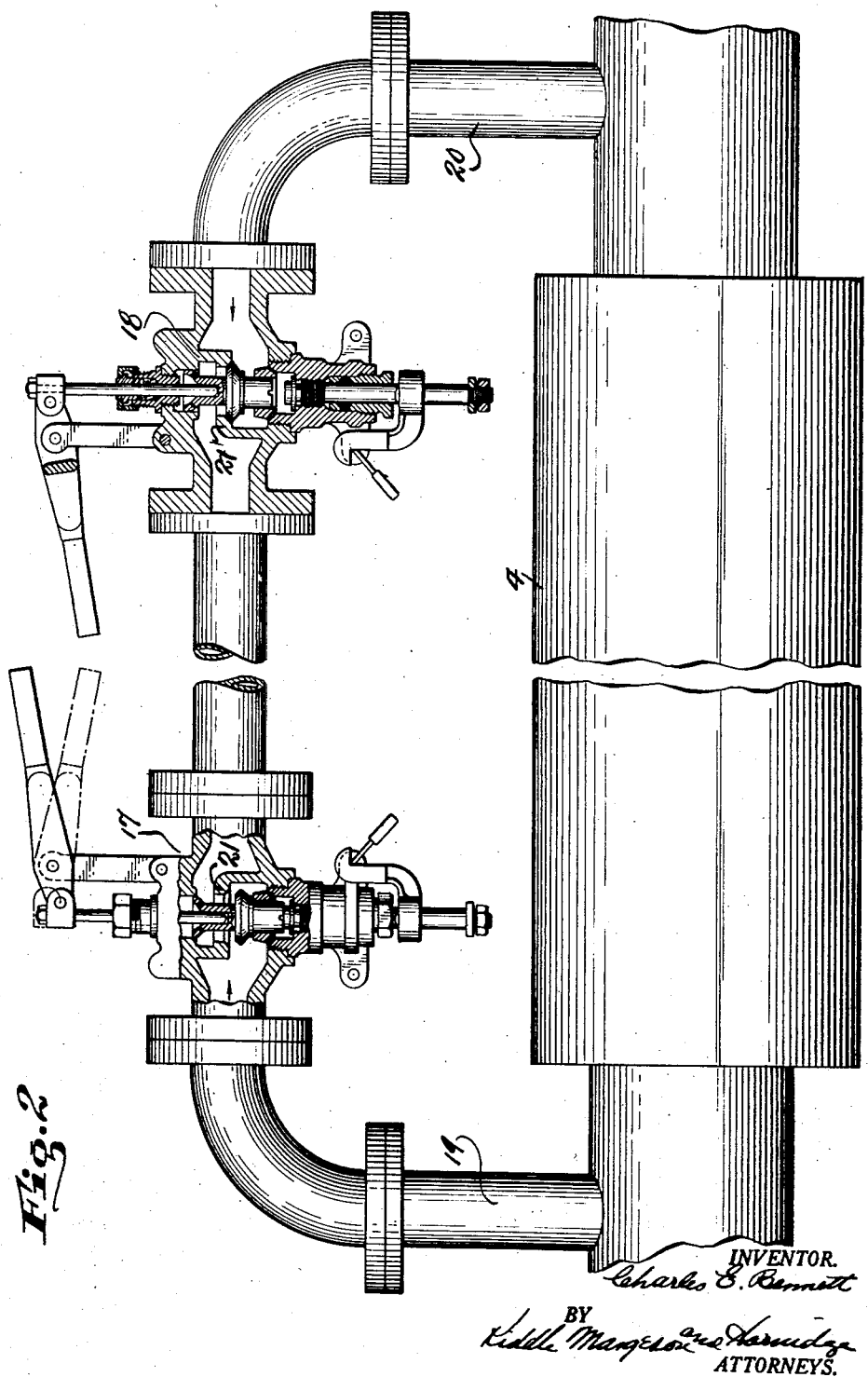

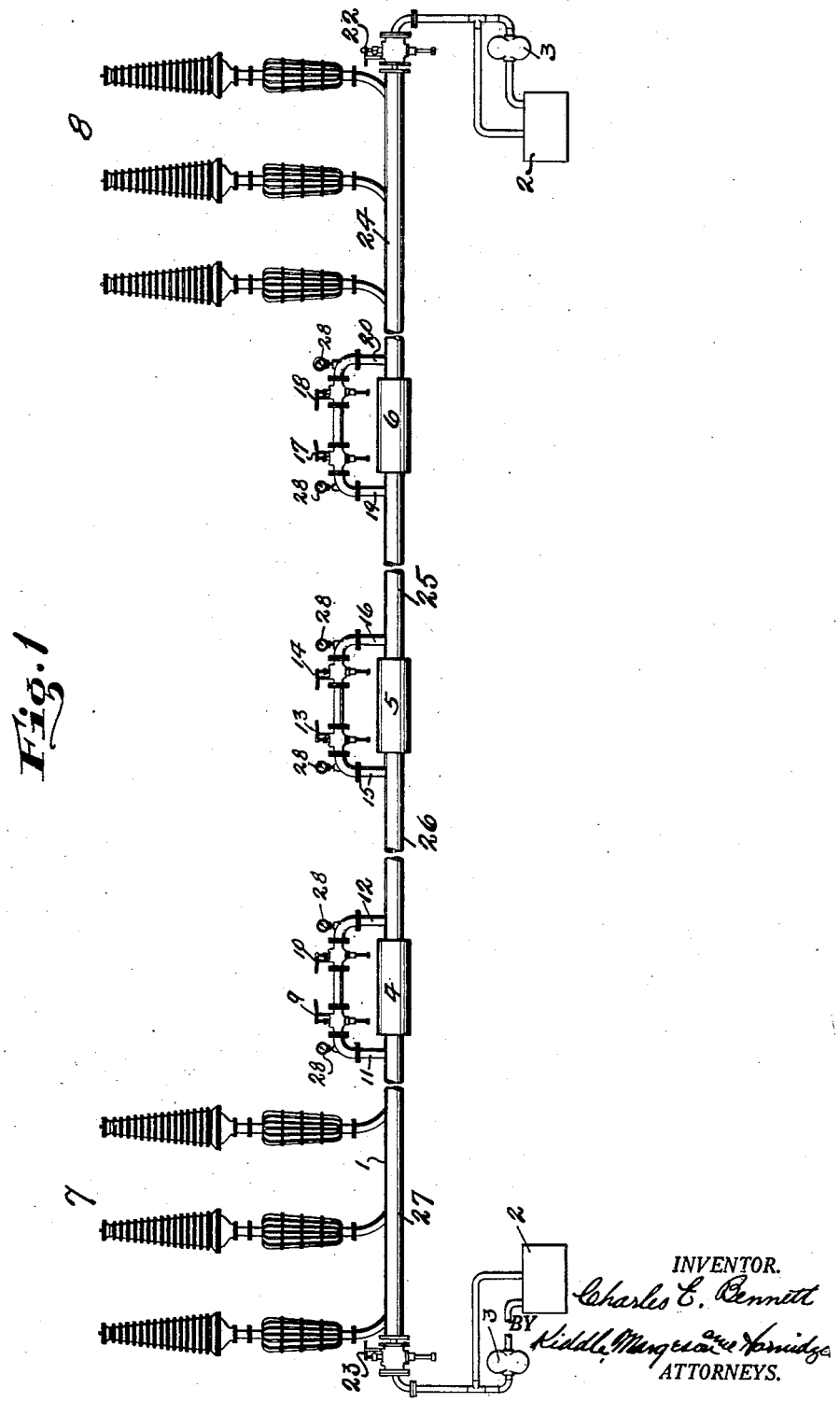

Patented Oct. 2, 1934

1,975,075

UNITED STATES PATENT OFFICE 1,975,075

ELECTRIC CABLE SYSTEM

Charles E. Bennett, Hawthorne, N. J., assignor to The Okonite-Callender Cable Company, Incorporated, Paterson, N. J., a corporation of New Jersey Application September 2, 1932, Serial No. 631,441

3 Claims. (Cl. 247—3)

This invention is directed to an improvement in cable systems with reference particularly to cable systems of the type in which the insulated conductors of the cable are immersed in oil under pressure, such for example as shown in my copending application Serial No. 553,714, filed July 29, 1931.

One of the objects of my invention is the provision of a construction whereby accidental draining of the cable system is effectually prevented and whereby the source of trouble can be readily located.

In general my improved cable system comprises a pipe into which the cable is drawn and by which it is enclosed, this pipe providing a reservoir which is maintained full of oil or other insulating fluid kept under a high pressure at all times; the purpose of the present invention is to provide a construction in which should a break occur in the pipe the leaking section of the system will be cut off or isolated so that the whole system cannot be drained of oil. It will be appreciated from the following description that my construction is also such that the break can be readily located.

In the drawings accompanying this application:

Fig. 1 is more or less of a diagrammatic view of a cable system embodying my invention; while Fig. 2 is an enlarged view with respect to Fig. 1 of the cable system adjacent a stop joint showing the mechanism whereby the cable is automatically sectionalized in the event of a break to prevent draining of the system.

Referring to the drawings in detail and first of all to Fig. 1, my improved cable system comprises a pipe 1 containing separately insulated cable conductors as disclosed in my copending application above referred to, this pipe being kept full of oil or other insulating liquid at all times under high pressure.

For the purposes of this application, 2 designates oil supply tanks or other fluid insulation supply tanks, and reference characters 3 designate pumps at each end of the system by which the oil or other insulating fluid is supplied to the pipe 1 and maintained under pressure therein. The pipe is equipped with joints 4, 5 and 6 which, it is to be understood, are of any suitable number and construction, the number and make-up or construction of these joints constituting no part of the present invention.

The cable shown in Fig. 1 is a three conductor cable and I have shown the same terminated at 7 and 8. The terminal construction illustrated constitutes the subject matter of other applications and hence will not be described in any detail herein.

It will be noted that at each of the joints 4, 5 and 6 I have provided a by-pass construction embodying a valve and pipe whereby the pipe sections at either side of the joints 4, 5 and 6 are maintained in communication with each other. This valve and pipe construction at the joint 4 comprises balanced valves 9 and 10 and pipes 11 and 12; at the joint 5 balanced valves 13 and 14 and pipes 15 and 16; and at the joint 6 balanced valves 17 and 18 and pipes 19 and 20.

As will be seen from Fig. 2 the valves are of a type known commercially as automatic shut off valves, permitting of a normal movement of the oil in the pipe longitudinally of the pipe in both directions. In Fig. 2 I have shown the valve 18 in closed position on its seat 21 merely for purposes of illustration to indicate the action of the valves in case of a break or leakage in the lines. With the system in working operation or normal condition all of the balanced valves are set in open position as I have indicated in Fig. 1.

It is to be noted also that at each end of the system intermediate the pump 3 and the first length of pipe 1 a valve is provided which is the same as the valves 9 and 10, the valve at one end of the system being designated 22 and that at the other end 23.

Assuming that a break occurs in the system at length 24 for instance, then there is an increase in oil flow past valves 17 and 22 causing these two valves automatically to close thereby isolating the section or length 24 to prevent draining of the system.

Should a break occur in the length 25 instead of in the length 24, then the valves 13 and 18 will close automatically and the draining of the system is effectually prevented except for the length 25.

Should a break occur in the length 26, for example, then the valves 9 and 14 will close so as to isolate the length 26 and prevent draining of the remainder of the system.

Finally should a break occur in the length 27, then the valves 23 and 10 will close to isolate length 27 from the remainder of the system and prevent draining of the system.

As above stated it will be appreciated that as many joints such as shown at 4, 5 and 6 may be provided in the system as the length of the system may require and that the valve mechanism above described will be provided at each joint.

The valves 9, 10, etc., are of standard construction and may be bought in the open market so that I have deemed it unnecessary to explain their construction in detail.

In addition to all of the foregoing, I equip the pipes 11, 12, 15, etc., with pressure gauges 28, which in conjunction with the automatic shut-off valves will indicate by pressure drop the particular cable length in which the break has occurred.

What I claim is:—

1. An electric power transmission system comprising in combination an impervious pipe, separately insulated cable conductors in said pipe, pressure supply means at each end of the system for maintaining said pipe filled with oil under high pressure in which said cable conductors are immersed, and automatic shut-off valves connected into said pipe at intervals and adapted to permit of a normal movement of the said oil longitudinally of the pipe in both directions, abnormal movement of the said oil due to the same escaping through a leak in the pipe effecting closure of a valve at each side of the leak automatically to isolate the leaking portion of the pipe to prevent draining of the system of oil.

2. An electric power transmission system comprising in combination a plurality of separately insulated cable conductors, an impervious pipe enclosing said conductors, pressure supply means at each end of the system for maintaining said pipe filled with oil under high pressure in which said insulated conductors are immersed, automatic shut-off valves connected into said pipe at spaced intervals along said pipe and adapted to permit of normal movement of the oil longitudinally of the pipe in both directions, predetermined movement of the oil in the pipe due to a leak in the pipe closing a valve at each side of the leak to isolate the leaking portion of the pipe to prevent draining the system of oil, and indicating means cooperable with the isolating means for indicating the defective portion.

3. An electric power transmission system comprising in combination an impervious pipe, separately insulated cable conductors in said pipe, pressure supply means for maintaining said pipe filled with oil under high pressure in which said insulated conductors are immersed, joints at intervals along said pipe, pipes communicating with the interior of the first mentioned pipe at each side of said joints, automatic shut-off valves in said pipes adapted to permit of movement of the oil longitudinally of the first mentioned pipe in both directions, abnormal movement of the oil due to a leak in the first mentioned pipe effecting closure of a valve at each side of the leak automatically to isolate the leaking portion of the pipe to prevent draining of the system.

CHARLES E. BENNETT.